(12) United States Patent
Park (10) Patent No.: US 12,505,572 B2
(45) Date of Patent: Dec. 23, 2025

(54) TERMINAL DEVICE FOR INDOOR POSITIONING BASED ON OBJECT RECOGNITION, SERVICE SERVER, AND METHOD THEREFOR

(71) Applicant: DABEEO INC., Seoul (KR)

(72) Inventor: Ju Hum Park, Bucheon-si (KR)

(73) Assignee: DABEEO, INC., Seoul (KR)

( * ) Notice: Subject to any disclaimer, the term of this patent is extended or adjusted under 35 U.S.C. 154(b) by 340 days.

(21) Appl. No.: 18/251,038

(22) PCT Filed: Nov. 4, 2020

(86) PCT No.: PCT/KR2020/015298
§ 371 (c)(1),
(2) Date: Apr. 28, 2023

(87) PCT Pub. No.: WO2022/097765
PCT Pub. Date: May 12, 2022

(65) Prior Publication Data
US 2023/0410351 A1    Dec. 21, 2023

(51) Int. Cl.
*G06T 7/70*    (2017.01)
*G01C 21/16*    (2006.01)
(Continued)

(52) U.S. Cl.
CPC .............. *G06T 7/70* (2017.01); *G01C 21/206* (2013.01); *G06T 7/50* (2017.01); *G06V 10/74* (2022.01);
(Continued)

(58) Field of Classification Search
CPC ... G06T 7/70; G06T 7/50; G06T 2207/10028; G06T 2207/20081; G06T 7/75;
(Continued)

(56) References Cited

U.S. PATENT DOCUMENTS

| | | | |
|---|---|---|---|
| 2009/0088968 A1* | 4/2009 | Tsutsui | G01C 21/3848 |
| | | | 701/532 |
| 2011/0010023 A1 | 1/2011 | Kunzig et al. | |

(Continued)

FOREIGN PATENT DOCUMENTS

| | | |
|---|---|---|
| JP | 2009205226 A | 9/2009 |
| JP | 2011022157 A | 2/2011 |

(Continued)

OTHER PUBLICATIONS

Extended European Search Report issued in corresponding EP Application No. 20960867.8 dated Jul. 12, 2024 (7 pages).

(Continued)

*Primary Examiner* — Chineyere Wills-Burns
*Assistant Examiner* — Lucius Cameron Gree Allen
(74) *Attorney, Agent, or Firm* — Osha Bergman Watanabe & Burton LLP (57) ABSTRACT

Disclosed are a terminal device for indoor positioning based on object recognition, a service server, and a method therefor. A terminal device according to one aspect of the present invention comprises: a storage unit for storing an indoor map in which preset coordinate values for each object are matched; a photographing unit; and a control unit for recognizing first and second objects from an image obtained through the photographing unit, estimating the respective virtual space positions of the first and second objects, estimating a virtual space distance between a user and each of the first and second objects by using a virtual space position of the user and the virtual space positions of the first and second objects, and estimating an indoor position of the user by using the virtual space distance.

9 Claims, 8 Drawing Sheets

(51) Int. Cl.
  *G01C 21/20* (2006.01)
  *G06N 20/00* (2019.01)
  *G06T 7/50* (2017.01)
  *G06T 7/73* (2017.01)
  *G06V 10/10* (2022.01)
  *G06V 10/70* (2022.01)
  *G06V 10/74* (2022.01)
  *G06V 10/94* (2022.01)
  *G06V 20/10* (2022.01)
  *G06V 20/20* (2022.01)
  *G09B 29/00* (2006.01)

(52) U.S. Cl.
  CPC .............. *G06T 2207/10028* (2013.01); *G06T 2207/20081* (2013.01)

(58) Field of Classification Search
  CPC ........... G06T 2207/20084; G06T 2207/30244; G01C 21/206; G01C 21/1656; G06V 10/74; G06V 10/17; G06V 10/70; G06V 10/95; G06V 20/20; G06V 20/10; G09B 29/006; G06N 20/00
  USPC ........................................................ 382/103
  See application file for complete search history.

(56) References Cited

U.S. PATENT DOCUMENTS

| | | | | |
|---|---|---|---|---|
| 2012/0194644 | A1* | 8/2012 | Newcombe | G06T 7/20 348/46 |
| 2014/0168461 | A1* | 6/2014 | Dani | G06T 7/55 348/222.1 |
| 2016/0005229 | A1 | 1/2016 | Lee et al. | |
| 2017/0061631 | A1* | 3/2017 | Karasudani | G06T 1/0007 |
| 2019/0206140 | A1 | 7/2019 | Chen et al. | |
| 2019/0234744 | A1* | 8/2019 | Wang | H04W 4/024 |
| 2020/0202609 | A1 | 6/2020 | Amimoto et al. | |
| 2021/0011483 | A1* | 1/2021 | Li | G06T 7/74 |
| 2021/0055109 | A1* | 2/2021 | Teng | G01C 21/12 |
| 2021/0104064 | A1* | 4/2021 | Shin | G06V 20/10 |
| 2021/0358150 | A1* | 11/2021 | Lin | H04N 13/271 |

FOREIGN PATENT DOCUMENTS

| | | |
|---|---|---|
| JP | 2011043405 A | 3/2011 |
| JP | 2015146091 A | 8/2015 |
| JP | 2017-102861 A | 6/2017 |
| JP | 2019-046464 A | 3/2019 |
| JP | 2019171018 A | 10/2019 |
| KR | 10-2011-0025025 A | 3/2011 |
| KR | 10-2013-0108678 A | 10/2013 |
| KR | 10-2016-0003553 A | 1/2016 |
| KR | 10-2018-0126408 A | 11/2018 |
| KR | 10-2021-0015226 A | 2/2021 |
| WO | 2020183659 A1 | 9/2020 |
| WO | 2020195875 A1 | 10/2020 |

OTHER PUBLICATIONS

International Search report issued for corresponding international patent application No. PCT/KR2020/015298, mailed Jul. 6, 2021 (6 pages).
Written Opinion report issued for corresponding international patent application No. PCT/KR2020/015298, mailed Jul. 6, 2021 (6 pages).
Office Action issued in Japanese Application No. 2023-547168, mailed on Dec. 6, 2023 (5 pages).
Office Action issued in Chinese Application No. 202080106643.8 mailed on Oct. 11, 2024 (17 pages).

* cited by examiner

TERMINAL DEVICE FOR INDOOR POSITIONING BASED ON OBJECT RECOGNITION, SERVICE SERVER, AND METHOD THEREFOR

TECHNICAL FIELD

The present invention relates to a terminal device, a service server, a method for indoor positioning based on object recognition, and more particularly, to a terminal device, a service server, a method for indoor positioning based on object recognition in which an object may be recognized in an image captured through an imaging unit of the terminal device and the recognized object may be matched to an indoor map having vectorized coordinates to estimate the position of a user.

BACKGROUND ART

Several services for providing selective data to multiple users at desired locations, that is, various location-based services (LBSs) based on the current location of a user, for example, a real-time data popup service, a selective data transmission service according to a user location, and an indoor navigation service, are being provided.

These services are based on a technology for measuring the location of a user. According to LBSs, the location of a user may be measured using WiFi, a beacon, etc., and a service, such as an indoor navigation service or the like, may be provided. In order to appropriately provide such an LBS, it is important to accurately find the location of a user. Here, in the case of using WiFi to find the location of a user, the magnitude of a WiFi reception signal used for location calculation fluctuates very widely, making it difficult to provide an appropriate LBS. In the case of using beacon transmitters, it may be difficult to measure the location of a user depending on an arrangement interval of the beacon transmitters. For example, to measure the location of a user using a beacon, the distance between the beacon and the user should be accurately measured, but the error increases with an increase in the distance between the beacon and the user. Also, conventional indoor positioning technologies have a problem in that expensive equipment or infrastructure is required.

Therefore, it is necessary to develop a technology for estimating an indoor position without expensive equipment or infrastructure.

As the related art of the present invention, there is Korean Patent Publication No. 2011-0025025.

DISCLOSURE

Technical Problem

The present invention was devised to solve the above problems and is directed to providing a terminal device, a service server, and a method for indoor positioning based on object recognition in which an object in may be recognized an image captured through an imaging unit of the terminal device and the position of a user may be estimated using the object.

Objectives of the present invention are not limited to that described above, and other objectives which have not been described may be clearly understood by those of ordinary skill in the art from the following description.

Technical Solution

One aspect of the present invention provides a terminal device including a storage unit configured to store an indoor map on which preset coordinate values are matched with each object, an imaging unit, and a control unit configured to recognize a first object and a second object in an image acquired through the imaging unit, estimate virtual space positions of the first and second objects, estimate a virtual space distance between a user and each of the first and second objects using the virtual space positions of the first and second objects and a virtual space position of the user, and estimate an indoor position of the user using the virtual space distances.

In the present invention, the terminal device may further include a display unit, and the control unit may display the position of the user on the indoor map through the display unit together with the image acquired through the imaging unit.

In the present invention, the control unit may recognize the first and second objects using deep learning and estimate each of the virtual space positions of the first and second objects using point clouds generated in a virtual space.

In the present invention, the control unit may estimate the virtual space position of the user using a dead reckoning algorithm.

In the present invention, the control unit may calculate a first Euclidean distance between the virtual space position of the first object and the virtual space position of the user and calculate a second Euclidean distance between the virtual space position of the second object and the virtual space position of the user.

In the present invention, the control unit may acquire indoor coordinates of each of the first and second objects from the indoor map, estimate a first indoor prediction position and a second indoor prediction position of the user using the first and second Euclidean distances and the indoor coordinates of the first and second objects, calculate a virtual-space outer product corresponding to an outer product of a first virtual vector and a second virtual vector which are respective vectors from the virtual space position of the user to the virtual space positions of the first and second objects, calculate a first indoor outer product corresponding to an outer product of a first real vector and a second real vector which are vectors from the first indoor prediction position to the indoor coordinates of the first and second objects, and a second indoor outer product corresponding to an outer product of a first real vector and a second real vector which are vectors from the second indoor prediction position to the indoor coordinates of the first and second objects, and estimate an indoor prediction position at which the first or second indoor outer product has the same sign as the virtual-space outer product as the indoor position of the user.

In the present invention, the terminal device may further include a communication unit configured to communicate with a service server through a communication network, and when an image collection application stored in the storage unit is executed, the control unit may image predetermined objects through the imaging unit, store a captured image of each of the objects, and transmit the stored captured image of each of the objects to the service server through the communication unit.

Another aspect of the present invention provides a service server including a communication unit configured to receive a captured image of each object set on an indoor map and an object recognition model generation unit configured to learn the captured image of each object received through the communication unit and generate an object recognition model for object recognition by matching each object to coordinates of the object through the learned captured image of the object.

In the present invention, the service server may further include a position estimation unit configured to recognize, when a position estimation request signal including a captured image is received from a terminal device through the communication unit, first and second objects by inputting the captured image to the object recognition model, estimate virtual space positions of the first and second objects, estimate a virtual space distance between a user and each of the first and second objects using the virtual space positions of the first and second objects and a virtual space position of the user, estimate an indoor position of the user using the virtual space distances, and transmit the estimated indoor position to the terminal device.

Another aspect of the present invention provides a method of an indoor positioning service based on object recognition, the method including recognizing, by a terminal device, a first object and a second object in an image acquired through an imaging unit and estimating virtual space positions of the first and second objects, estimating, by the terminal device, a virtual space distance between a user and each of the first and second objects using the virtual space positions of the first and second objects and a virtual space position of the user, and estimating, by the terminal device, an indoor position of the user using the virtual space distances.

In the present invention, the estimating of the virtual space positions of the first and second objects may include recognizing, by the terminal device, the first and second objects using deep learning and estimating each of the virtual space positions of the first and second objects using point clouds generated in a virtual space.

In the present invention, the estimating of the virtual space distance may include estimating, by the terminal device, the virtual space position of the user using a dead reckoning algorithm and calculating, by the terminal device, a first Euclidean distance between the virtual space position of the first object and the virtual space position of the user and a second Euclidean distance between the virtual space position of the second object and the virtual space position of the user.

In the present invention, the estimating of the indoor position of the user may include acquiring, by the terminal device, indoor coordinates of each of the first and second objects from an indoor map and estimating a first indoor prediction position and a second indoor prediction position of the user using the first and second Euclidean distances and the indoor coordinates of the first and second objects, calculating, by the terminal device, a virtual-space outer product corresponding to an outer product of a first virtual vector and a second virtual vector which are respective vectors from the virtual space position of the user to the virtual space positions of the first and second objects, calculating a first indoor outer product corresponding to an outer product of a first real vector and a second real vector which are vectors from the first indoor prediction position to the indoor coordinates of the first and second objects, and a second indoor outer product corresponding to an outer product of a first real vector and a second real vector which are vectors from the second indoor prediction position to the indoor coordinates of the first and second objects, and estimating, by the terminal device, an indoor prediction position at which the first or second indoor outer product has the same sign as the virtual-space outer product as the indoor position of the user.

Advantageous Effects

According to the present invention, the position of a user is estimated using an image captured in an indoor environment through a camera of a user terminal device so that an indoor position can be accurately estimated without expensive equipment or infrastructure.

Meanwhile, effects of the present invention are not limited to that described above, and may include various effects within a range apparent to those of ordinary skill in the art from the following description.

MODES OF THE INVENTION

Hereinafter, a terminal device and service server for indoor positioning based on object recognition and a method therefor according to embodiments of the present invention will be described with reference to the accompanying drawings. In this process, the thicknesses of lines or the sizes of components shown in the drawings may be exaggerated for clarity and convenience of description.

Terms described below are those defined in consideration of their functions in the present invention and may vary depending on an intention of a user or an operator, or customs. Therefore, the terms should be defined on the basis of the overall content of this specification.

Also, embodiments described herein may be implemented as, for example, a method or process, a device, a software program, or a data stream or signal. Even when an embodiment is discussed only in one form of implementation (e.g., only as a method), the discussed feature may also be implemented in another form (e.g., a device or program). The device may be implemented as appropriate hardware, software, firmware, etc. The method may be implemented by a device such as a processor, which generally includes a processing device including a computer, a microprocessor, an integrated circuit, a programmable logic device, etc. The processor includes a communication device, such as a computer, a cellular phone, a portable/personal information terminal (a personal digital assistant (PDA)), or another device, that facilitates information communication between end users.

Figure 1:
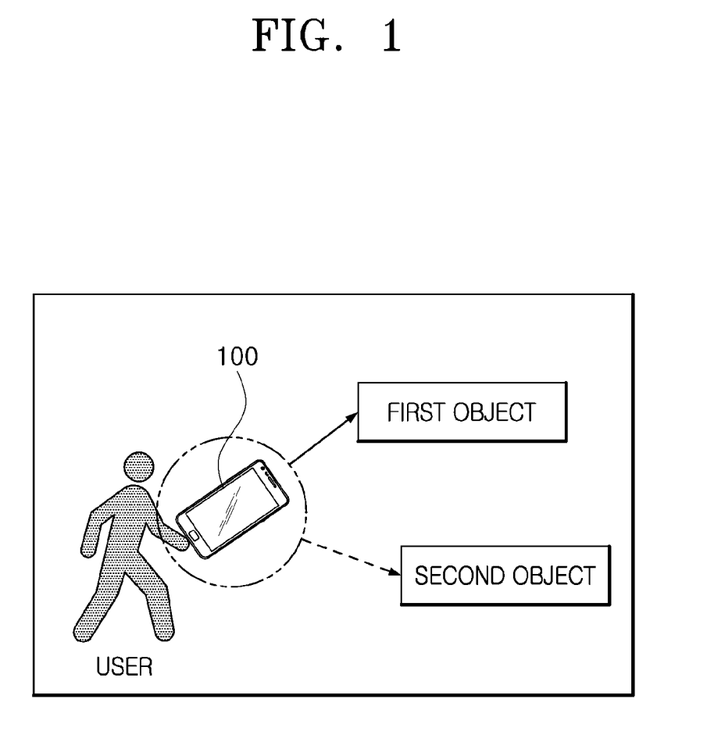
FIG. 1 is a conceptual diagram illustrating indoor positioning based on object recognition according to an embodiment of the present invention.

FIG. 1 is a conceptual diagram illustrating indoor positioning based on object recognition according to an embodiment of the present invention.

Referring to FIG. 1, a user acquires an image through an imaging unit of a terminal device 100, and the terminal device 100 recognizes preset first and second objects in the acquired image. After that, the terminal device 100 matches the recognized first and second objects to a vectorized indoor map, thereby estimating an indoor position of the user.

Such a system for estimating an indoor position of a user through object recognition will be described below with reference to FIG. 2.

Figure 2:
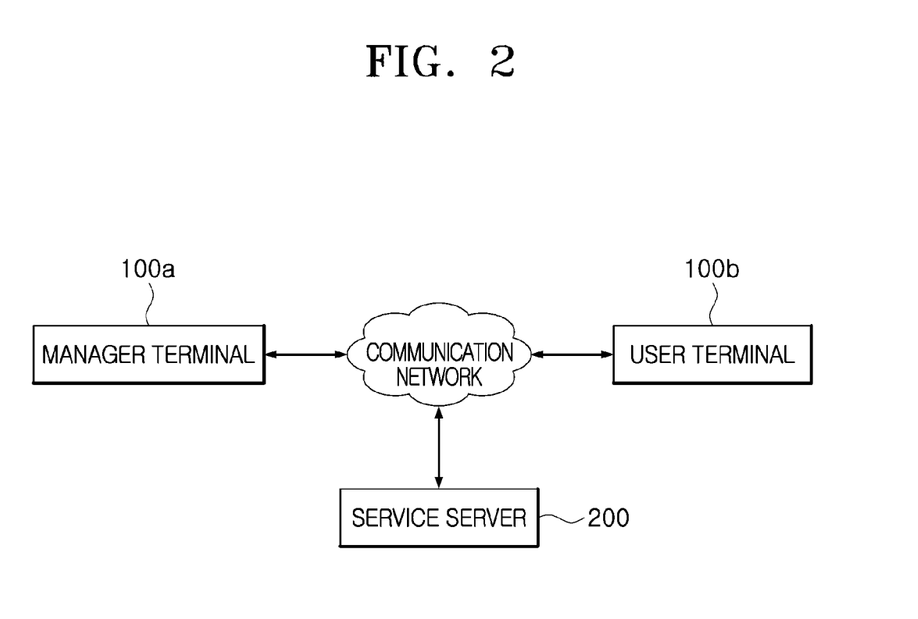
FIG. 2 is a diagram illustrating an indoor positioning system based on object recognition according to an embodiment of the present invention.

FIG. 2 is a diagram illustrating an indoor positioning system based on object recognition according to an embodiment of the present invention.

Referring to FIG. 2, the indoor positioning system based on object recognition according to the embodiment of the present invention includes a manager terminal 100a, a service server 200, and a user terminal 100b. Here, the manager terminal 100a, the service server 200, and the user terminal 100b may be connected through wireless communication networks of various forms such as WiFi, Third Generation (3G), Long Term Evolution (LTE), etc.

The manager terminal 100A maps objects which are selected to be used for user position estimation to an indoor map. In other words, a manager may select objects to be used for user position estimation. Here, the objects may be selected from among stationary objects (e.g., a signboard, a sign, a fire hydrant, etc.), and objects having unique features indoors may be mainly selected. After that, the manager maps the selected objects to the indoor map made in advance. In other words, the manager stores coordinate values of each of the selected objects on the indoor map. Here, the indoor map may be a digitized (vectorized) map which is made using a computer-aided design (CAD) drawing, a point cloud map, a lidar map an image map, etc., and the digitized map may be a map which is usable by the manager terminal 100a and the user terminal 100b. Also, the indoor map may include key information of the corresponding indoor area. For example, in the case of a shopping mall, the indoor map may include boundaries distinguishing between stores, store names, etc.

Also, the manager terminal 100a stores an image collection application, stores images of objects captured through the image collection application to train a deep learning network for object recognition, and transmits the stored object-specific captured images to the service server 200. Here, the captured images may be images of the objects captured in various directions.

As described above, the manager terminal 100a captures images including preselected objects in various directions and provides the object-specific captured images to the service server 200 so that the object-specific captured images may be used as training data for object recognition.

The service server 200 collects a captured image of each object which is set on the indoor map from the manager terminal 100a and generates an object recognition model by learning the collected object-specific captured images. Here, the service server 200 may generate the object recognition model using deep learning. Specifically, when the object-specific captured images are received, the service server 200 trains a deep learning network which stores an object name together with image pixel coordinate values of four vertices of the smallest quadrangle including a corresponding object (hereinafter, a "bounding box"). The deep learning network may be designed as one of various models related to object recognition. For example, a you only look once (YOLO) network may be used as the deep learning network.

Also, when a position estimation request signal including a captured image is received from the user terminal 100b, the service server 200 inputs the captured image to a position estimation model to estimate a position of the user terminal 100b.

The service server 200 will be described in detail below with reference to FIG. 6.

A position estimation application is stored in the user terminal 100b. When surroundings are imaged through the position estimation application, the user terminal 100b recognizes objects (e.g., a signboard, a fire hydrant, a frame, a door, etc.), in captured images and estimates a position of the user using location coordinates and distance estimation values of the recognized objects.

Meanwhile, although the manager terminal 100a and the user terminal 100b are described separately in the present embodiment, the manager terminal 100a and the user terminal 100b may be the same terminal. Therefore, for convenience of description, the manager terminal 100a and the user terminal 100b will be referred to as the terminal device 100 below.

Figure 3:
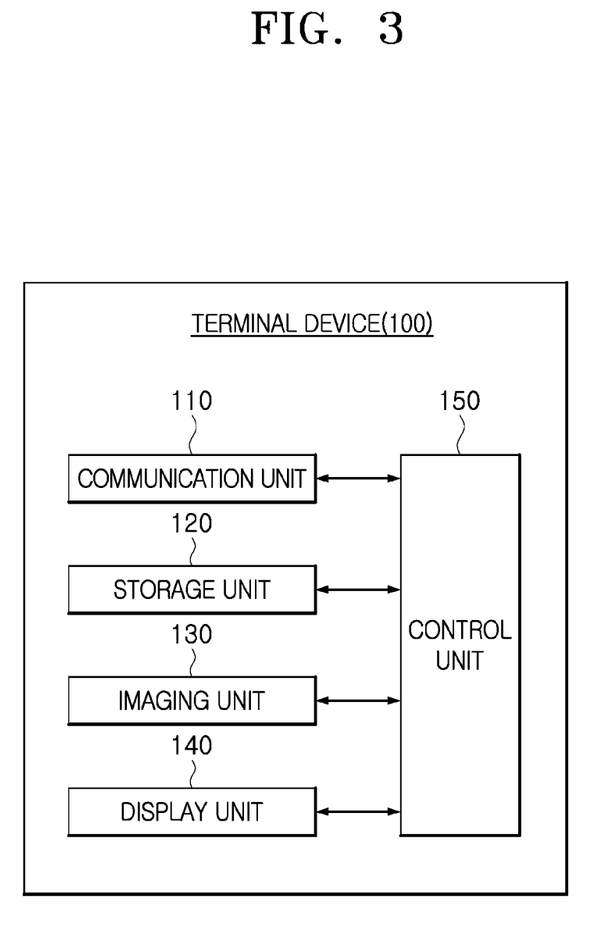
FIG. 3 is a block diagram showing a configuration of a terminal device according to an embodiment of the present invention.
Figure 4:
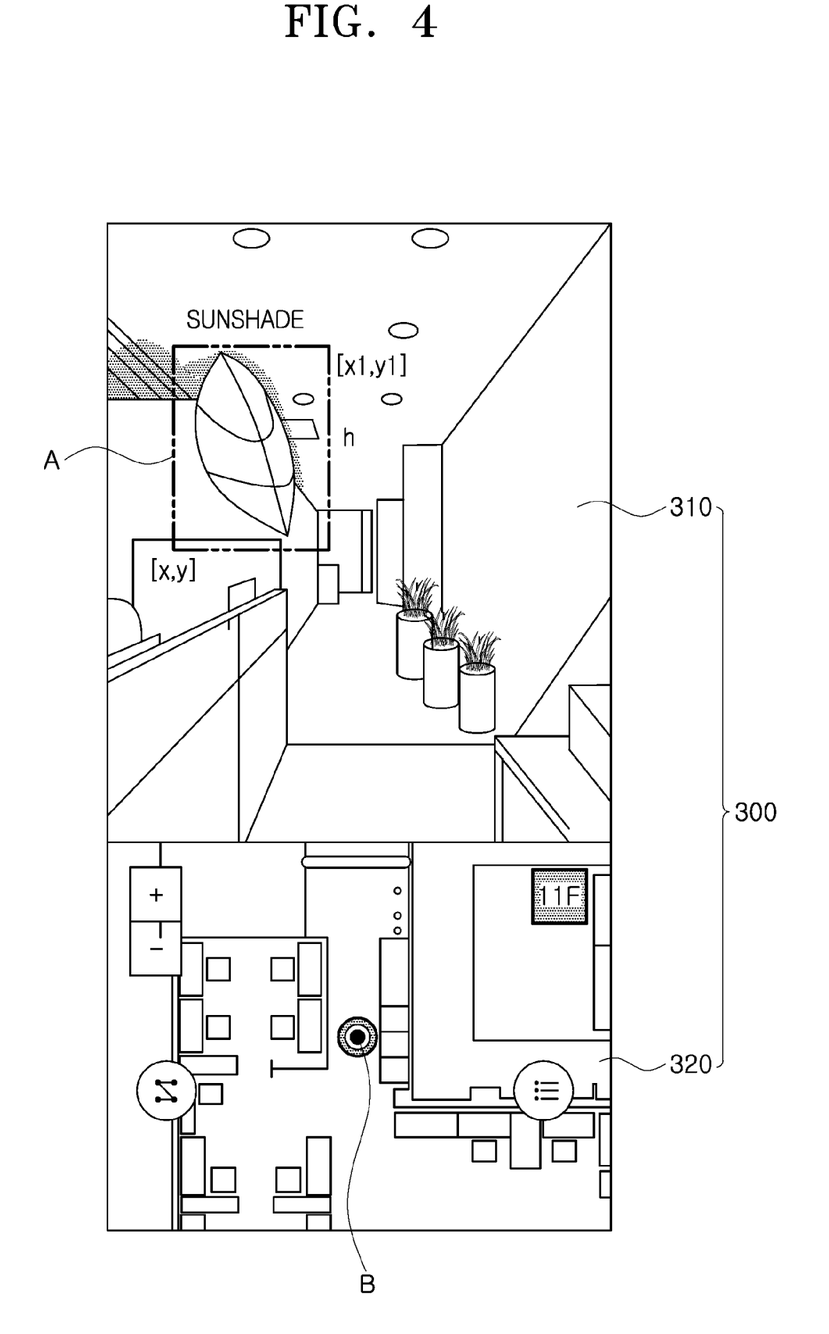
FIG. 4 is an example diagram illustrating a position estimation screen according to an embodiment of the present invention.
Figure 5:
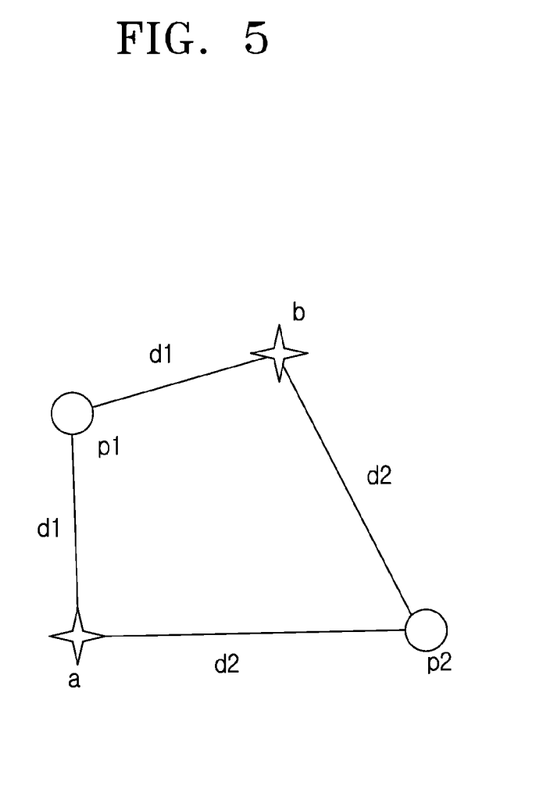
FIG. 5 is an example diagram illustrating a method of estimating an indoor position of a user using an outer product according to an embodiment of the present invention.

FIG. 3 is a block diagram showing a configuration of a terminal device according to an embodiment of the present invention, FIG. 4 is an example diagram illustrating a position estimation screen according to an embodiment of the present invention, and FIG. 5 is an example diagram illustrating a method of estimating an indoor position of a user using an outer product according to an embodiment of the present invention.

Referring to FIG. 3, the terminal device 100 according to the embodiment of the present invention includes a communication unit 110, a storage unit 120, an imaging unit 130, a display unit 140, and a control unit 150.

The communication unit 110 is a component for communicating with the service server 200 through a communication network and may transmit and receive various types of information such as an image acquired through the imaging unit 130 and the like. The communication unit 110 may be implemented in one of various forms such as a short-range communication module, a wireless communication module, a mobile communication module, a wired communication module, etc.

The storage unit 120 is a component for storing data related to operations of the terminal device 100. A well-known storage medium may be used as the storage unit 120. For example, one or more of well-known storage media, such as a read-only memory (ROM), a programmable ROM (PROM), an erasable PROM (EPROM), an electrically erasable PROM (EEPROM), a random-access memory (RAM), etc., may be used. In particular, an indoor map on which coordinate values are matched with each preselected object may be stored in the storage unit 120. Also, an image collection application for operating the imaging unit 130 to acquire a captured image of each preselected object may be stored in the storage unit 120 to collect training data for generating an object recognition model. Further, a position estimation application for estimating a current position using an image may be stored in the storage unit 120.

When the image collection application or the image estimation application is executed, the imaging unit 130 acquires an image and transmits the acquired image to the control unit 150. The imaging unit 130 may be, for example, a camera.

The display unit 140 is a component for displaying various types of information related to operations of the terminal device 100. In particular, the display unit 140 may display an image collection screen when the image collection application is executed, and may display a position estimation screen when the position estimation application is executed. The display unit 140 may also operate as an input unit for receiving information from a user.

When the image collection application stored in the storage unit 120 is executed, the control unit 150 operates the imaging unit 130, stores object-specific images captured through the imaging unit 130, and transmits the stored captured image of each object to the service server 200. In other words, when image collection from the preselected objects is completed in various directions, the control unit 150 transmits the collected objects and coordinates of the objects on the indoor map to the service server 200. Here, the number of objects on the indoor map, imaging directions, etc. may be set in advance by the manager.

Also, when the position estimation application stored in the storage unit 120 is executed, the control unit 150 operates the imaging unit 130, recognizes objects (e.g., a signboard, a fire hydrant, a frame, a door, etc.) in an image captured through the imaging unit 130, and estimates a position of the user using location coordinates and distance estimation values of the recognized objects.

In other words, the control unit 150 recognizes first and second objects in an image acquired through the imaging unit 130, estimates a virtual space position of each of the first and second objects, estimates a virtual space distance between the user and each of the first and second objects using the virtual space positions of the first and second objects and a virtual space position of the user, and estimates an indoor position of the user using the virtual space distances. Here, the virtual space may be a space shown on the screen.

A method of the control unit 150 estimating the indoor position of the user will be described in detail below.

When an image captured through the imaging unit 130 is acquired by executing the position estimation application, the control unit 150 generates point clouds in a space of the image (a virtual space shown on the screen, hereinafter, "virtual space"). Each point cloud has coordinates in the virtual space. Accordingly, at the time point when generation of a point cloud map starts (i.e., the time point when the user starts moving), coordinates may be set to [0, 0]. When the user moves all around the indoor space, a point cloud map for the indoor environment is generated, and each point has coordinates in the virtual space.

The control unit 150 recognizes predesignated first and second objects in the image acquired through the imaging unit 130 and estimates each of virtual space positions of the first and second objects using point clouds generated in the virtual space.

In other words, the control unit 150 recognizes the first and second objects using a deep learning technology and outputs a first bounding box including the first object and a second bounding box including the second object. Here, the control unit 150 may recognize the first and second objects using a YOLO network, and at least one of an object name, coordinate values, and a bounding box length may be displayed with the first and second bounding boxes. When the control unit 150 recognizes the first and second objects, the control unit 150 may output a recognition result such as a captured image 310 of a position estimation screen 300 shown in FIG. 4. Referring to FIG. 4, a bounding box A including an object called "sunshade" may be displayed, and coordinates [x, y] and [x1, y1] and two side lengths d and h may be displayed with the bounding box.

As described above, when an image including a learned object is input to a deep learning network, the control unit 150 outputs an object name and four vertex coordinates based on image pixels of a bounding box including the object.

Subsequently, the control unit 150 selects the most central point within each of the first bounding box and the second bounding box and estimates the selected points as virtual space positions of the first and second objects. In other words, the control unit 150 may select the most central point within each of the bounding boxes of the first and second objects and estimate coordinates of the selected points as virtual space coordinates.

When the virtual space positions of the first and second objects are estimated as described above, the control unit 150 estimates a virtual space distance between the user and each of the first and second objects using the virtual space positions of the first and second objects and a virtual space position of the user.

In other words, the control unit 150 continuously tracks the position of the user beginning at [0, 0] in the virtual space through sensors (e.g., a gyroscope, an accelerometer, a geomagnetic sensor, etc.) installed in the terminal device 100. The control unit 150 may track the virtual space position of the user using a dead reckoning algorithm. The dead reckoning algorithm may be an algorithm for estimating a travel distance and direction of a user on the basis of the sensors (not shown) installed in the terminal device 100 and tracking movement of the user.

When the virtual position of the user is estimated, the control unit 150 calculates a first Euclidean distance between the virtual space position of the first object and the virtual space position of the user and a second Euclidean distance between the virtual space position of the second object and the virtual space position of the user. Since the first and second Euclidean distances are scalar values, a distance value in the virtual space may be equal to a distance value on the indoor map.

The control unit 150 may estimate an actual position of the user on the indoor map using the virtual space positions of the first and second objects, the virtual space position of the user, and the Euclidean distances between the user and the virtual space positions of the first and second objects. Here, actual positions of the first and second objects on the indoor map may have preset coordinate values.

Therefore, the control unit 150 may acquire indoor coordinates (actual positions) of the first and second objects from the indoor map and estimate first and second indoor prediction positions of the user using the first and second Euclidean distances and the indoor coordinates of the first and second objects. In other words, since the position of the user and the positions of the first and second objects in the virtual space are known, the control unit 150 can draw a figure in a triangular shape. The positions of the first and second objects and the two distances between the user and the first and second objects may be derived from the indoor map. As a result, when the figure in the virtual space is matched to the indoor space, the user may be present at only two points on the indoor map. To select the position of the user from among the two points, it is necessary to know what directions from the user the first and second objects are in.

Therefore, the control unit 150 may use the concept of an outer product or vector product. In the virtual space, an outer product of two vectors from the user to the first and second objects has a direction. The direction should be the same as in the indoor map. In other words, the outer product of the two vectors from the user to the first and second objects in the virtual space should have the same sign as an outer product of two vectors from the user to the first and second objects on the indoor map. As a result, among the two points at which the user may be present on the indoor map, a point at which the outer product on the indoor map has the same sign as the outer product in the virtual space may be finally estimated as a position of the user.

Specifically, the control unit 150 calculates a virtual-space outer product of first and second virtual vectors which are vectors from the virtual space position of the user and the virtual space positions of the first and second objects. In other words, the control unit 150 may calculate a virtual-space outer product which is an outer product of the first virtual vector from the virtual space position of the user and the virtual space position of the first object and the second virtual vector from the virtual space position of the user and the virtual space position of the second object.

After that, the control unit 150 may calculate a first indoor outer product which is an outer product of a first real vector and a second real vector which are vectors from the first indoor prediction position to the indoor coordinates of the first and second objects, and a second indoor outer product corresponding to an outer product of a first real vector and a second real vector which are vectors from the second indoor prediction position to the indoor coordinates of the first and second objects. In other words, the control unit 150 may calculate the first indoor outer product which is the outer product of the first real vector from the first indoor prediction position to the indoor coordinates of the first object and the second real vector from the first indoor prediction position to the indoor coordinates of the second object. Also, the control unit 150 may calculate the second indoor outer product which is the outer product of the first real vector from the second indoor prediction position to the indoor coordinates of the first object and the second real vector from the second indoor prediction position to the indoor coordinates of the second object.

Subsequently, the control unit 150 may estimate an indoor prediction position at which the first or second indoor outer product has the same sign as the virtual-space outer product as the indoor position of the user.

Referring to FIG. 5, it is assumed that actual coordinates of first and second objects are p1 and p2 and distances from the actual coordinates of the first and second objects are d1 and d2. In this case, possible positions of a user on an indoor map may be two points a and b, and it is necessary to determine one of the two points as the position of the user. To determine the position of the user from among the two possible points, directions of the first and second objects shown in a virtual space should be taken into consideration.

When p2 is to the right of p1 in the virtual space, an outer product d2*d1 of two vectors may have a positive (+) sign, and when p2 is to the left of p1 in the virtual space, an outer product d2*d1 of two vectors may have a negative (−) sign. With respect to the possible positions a and b of the user on the indoor map, the outer product d2*d1 may be calculated, and a user position on the indoor map at which an outer product has the same sign as an outer product calculated in the virtual space may be determined as a final position of the user.

As described above, the control unit 150 may recognize two objects through the imaging unit 130 and estimate a position of a user using location coordinates of the two recognized objects and distance estimation values. In this way, according to the present invention, a vectorized indoor map is used so that a user can estimate his or her position by recognizing only two objects through the imaging unit 130 of the terminal device 100. Specifically, objects to be used for estimating a position of a user are mapped onto an indoor map in advance. In other words, coordinates of objects on the indoor map are stored. After that, when two objects are recognized in a virtual space shown on the screen of the terminal device 100, it is possible to estimate a position of the user by matching a geometric shape formed by the user and the two objects on the indoor map with a geometric shape formed by the user and the two objects in the virtual space.

When the indoor position of the user is estimated, the control unit 150 displays the position of the user together with captured images through the display unit 140 by showing the position of the user on the indoor map. In other words, when the position of the user is estimated through the position estimation application, the control unit 150 may display the position estimation screen 300 including the captured image 310 and an indoor map 320 on which a position B of the user is shown.

The control unit 150 may include at least one calculation device. The calculation device may be a general-use central processing unit (CPU), a programmable device element (a complex programmable logic device (CPLD) or a field programmable gay array (FPGA)) appropriately implemented for a specific purpose, an on-demand semiconductor processing unit (an application-specific integrated circuit (ASIC)), or a microcontroller chip.

Meanwhile, the terminal device 100 configured as described above may be an electronic device which may image surroundings through the imaging unit 130 and is applicable to various wired and wireless environments. For example, the terminal device 100 may be a PDA, a smartphone, a cellular phone, a personal communication service (PCS) phone, a Global System for Mobile Communications (GSM) phone, a wideband code division multiple access (CDMA) phone, a CDMA-2000 phone, a Mobile Broadband System (MBS) phone, etc. The terminal device 100 may be a small portable device. However, when the terminal device 100 is a camcorder or a laptop computer, it may be referred to as a mobile communication terminal. Accordingly, the terminal device 100 is not limited to small portable devices.

Figure 6:
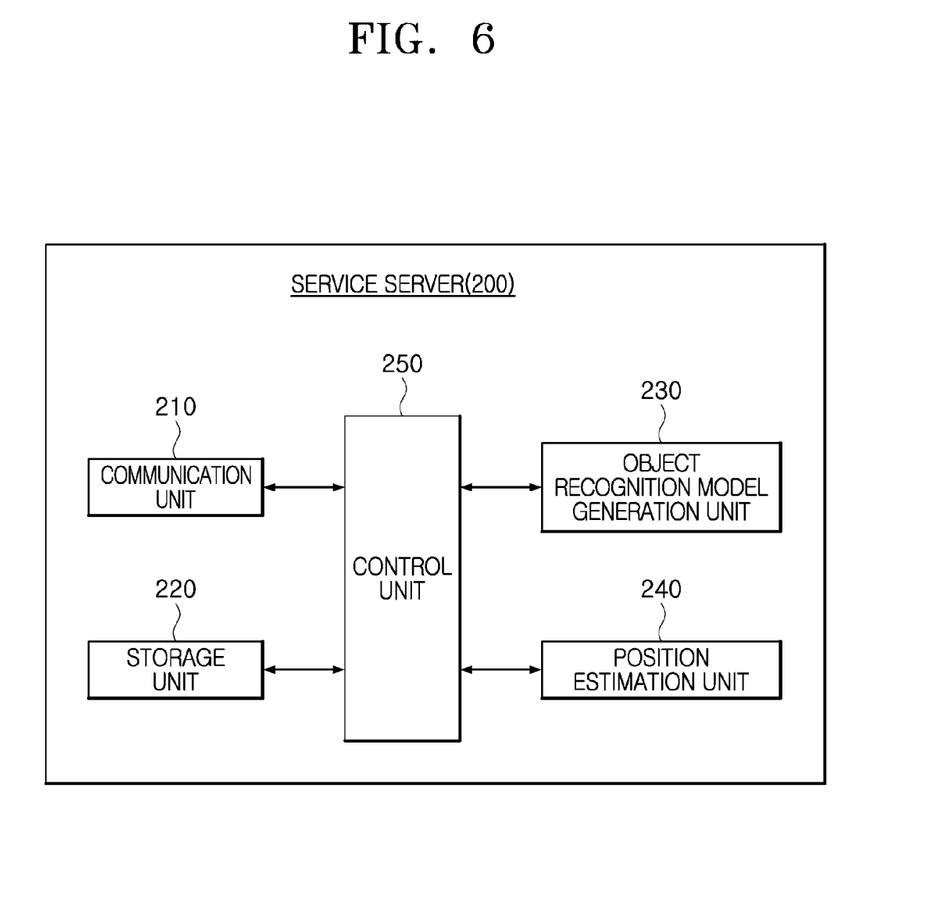
FIG. 6 is a block diagram showing a configuration of a service server according to an embodiment of the present invention.

FIG. 6 is a block diagram showing a configuration of a service server according to an embodiment of the present invention.

Referring to FIG. 6, the service server 200 according to the embodiment of the present invention includes a communication unit 210, a storage unit 220, an object recognition model generation unit 230, and a control unit 250.

The communication unit 210 receives object-specific captured images from the terminal device 100.

The storage unit 220 is a component for storing data related to operations of the service server 200. In particular, an indoor map storing coordinate values of each preselected object may be stored in the storage unit 220.

The object recognition model generation unit 230 receives the object-specific captured images from the terminal device 100 through the communication unit 210, learns a received captured image of each object, and generates an object recognition model for object recognition. Here, the object recognition model generation unit 230 may generate an object recognition model using deep learning. The object recognition model may have coordinate values of each object. Accordingly, when an image of which a position is unknown is input, the object recognition model may calculate an object in the image and coordinates of the object as output values.

Meanwhile, the service server 200 according to the present invention may further include a position estimation unit 240 which recognizes, when a position estimation request signal including a captured image is received from the terminal device 100 through the communication unit 210, first and second objects by inputting the captured image to the object recognition model, estimates virtual space positions of the first and second objects, estimates a virtual space distance between the user and each of the first and second objects using the virtual space positions of the first and second objects and a virtual space position of the user, estimates an indoor position of the user using the virtual space distances, and transmits the estimated indoor position to the terminal device. When the first and second objects are recognized, the position estimation unit 240 may cause the first and second objects to be displayed on the screen of the terminal device 100.

Meanwhile, the object recognition model generation unit 230 and the position estimation unit 240 may be separately implemented by a processor or the like required for executing a program on a computing device. As described above, the object recognition model generation unit 230 and the position estimation unit 240 may be implemented by physically independent components or implemented to be functionally divided in one processor.

The control unit 250 is a component for controlling operations of various constituent units of the service server 200 including the communication unit 210, the storage unit 220, the object recognition model generation unit 230, and the position estimation unit 240 and may include at least one calculation device. The calculation device may be a general-use CPU, a programmable device element (a CPLD or an FPGA) appropriately implemented for a specific purpose, an on-demand semiconductor processing unit (an ASIC), or a microcontroller chip.

Figure 7:
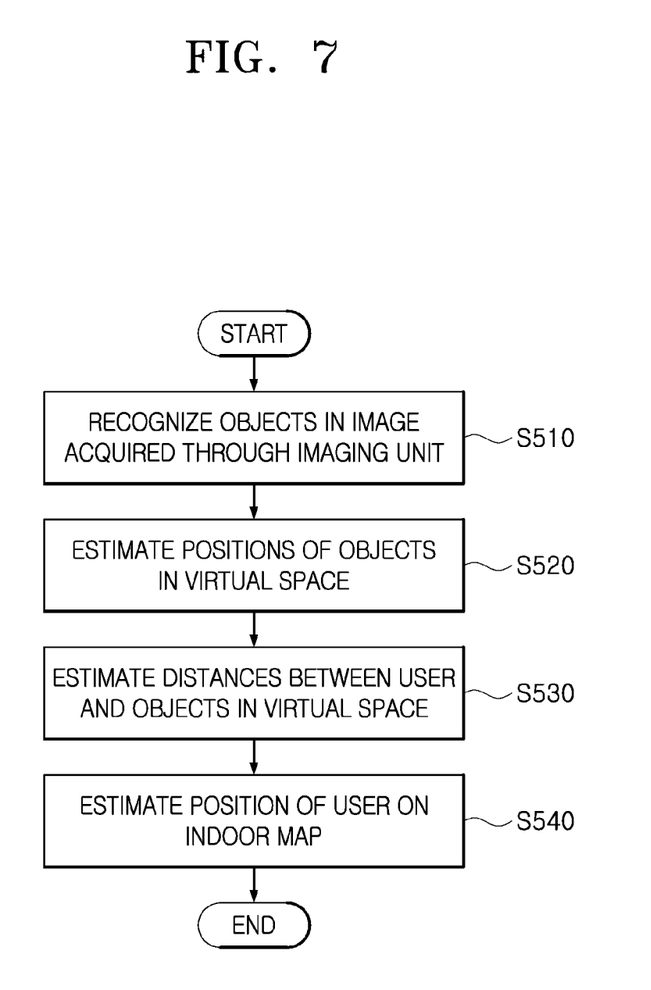
FIG. 7 is a flowchart illustrating an indoor positioning method based on object recognition according to an embodiment of the present invention.

FIG. 7 is a flowchart illustrating an indoor positioning method based on object recognition according to an embodiment of the present invention.

Referring to FIG. 7, when a position estimation application is executed, the terminal device 100 captures an image by operating the imaging unit 130 and recognizes first and second objects in the captured image (S510). Here, the terminal device 100 may recognize the first and second objects using a deep learning technology.

When operation S510 is performed, the terminal device 100 estimates each of virtual space positions of the first and second objects (S520). Here, the terminal device 100 may estimate each of the virtual space positions of the first and second objects using point clouds generated in a virtual space.

When operation S520 is performed, the terminal device 100 estimates a virtual space distance between a user and each of the first and second objects using the virtual space positions of the first and second objects and a virtual space position of the user (S530). Here, the terminal device 100 may track the virtual space position of the user using a dead reckoning algorithm. When the virtual space position of the user is estimated, the terminal device 100 may calculate a first Euclidean distance between the virtual space position of the first object and the virtual space position of the user and a second Euclidean distance between the virtual space position of the second object and the virtual space position of the user.

When operation S530 is performed, the terminal device 100 estimates a position of the user on the indoor map using the virtual space positions of the first and second objects, the virtual space position of the user, and the Euclidean distances between the user and the virtual space positions of the first and second objects (S540). A method of the terminal device 100 estimating the position of the user on the indoor map will be described in detail with reference to FIG. 8.

Figure 8:
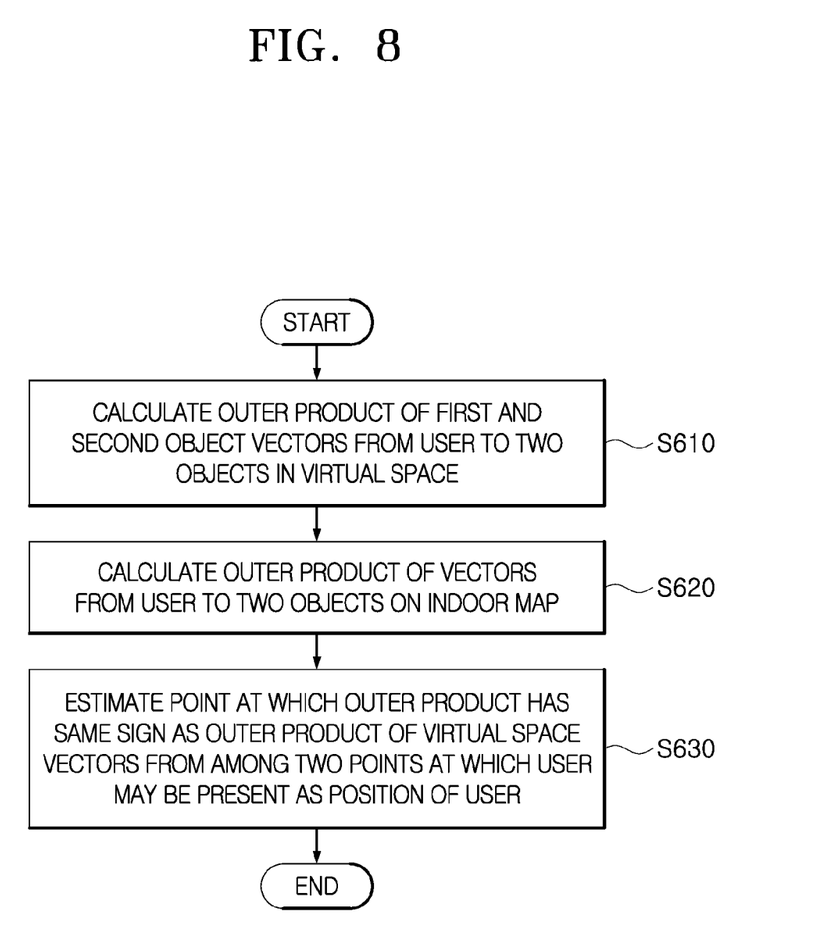
FIG. 8 is a flowchart illustrating a method of estimating a position of a user using an outer product according to an embodiment of the present invention.

FIG. 8 is a flowchart illustrating a method of estimating a position of a user using an outer product according to an embodiment of the present invention.

Referring to FIG. 8, the terminal device 100 calculates an outer product of two vectors from a user to first and second objects in a virtual space (S610). In other words, the terminal device 100 may calculate a virtual-space outer product corresponding to an outer product of a first virtual vector from the virtual space position of the user to the virtual space position of the first object and a second virtual vector from the virtual space position of the user to the virtual space position of the second object.

When operation S610 is performed, the terminal device 100 calculates an outer product of two vectors from the user to the first and second objects on an indoor map (S620). In other words, the terminal device 100 may calculate a first indoor outer product of first and second real vectors from a first indoor prediction position to indoor coordinates of the first and second objects and a second indoor outer product of first and second real vectors from a second indoor prediction position to the indoor coordinates of the first and second objects.

When operation S620 is performed, the terminal device 100 estimates, as a position of the user, a point at which an outer product has the same sign as the virtual-space outer product from among two points at which the user may be present on the indoor map (S630). In other words, the terminal device 100 may estimate an indoor prediction position at which the first or second indoor outer product has the same sign as the virtual-space outer product.

As described above, with a terminal device, a service server, and a method for indoor positioning based on object recognition according to embodiments of the present invention, the position of a user can be accurately estimated using an image captured in an indoor environment through a camera of a user terminal device so that an indoor position can be accurately estimated without expensive equipment or infrastructure.

The present invention has been described above with reference to embodiments shown in the drawings. However, the embodiments are only examples, and those of ordinary skill in the art should appreciate that various modifications and equivalents can be derived from the embodiments.

Therefore, the technical scope of the present invention should be determined according to the appended claims.

The invention claimed is:
1. A terminal device comprising:
a storage configured to store an indoor map on which preset coordinate values are matched with each object;
an imager; and
a controller configured to:
  recognize a first object and a second object in an image acquired through the imager,
  estimate virtual space positions of the first and second objects,
  estimate a virtual space distance between a user and each of the first and second objects using the virtual space positions of the first and second objects and a virtual space position of the user,
  calculate a first Euclidean distance between the virtual space position of the first object and the virtual space position of the user and calculate a second Euclidean distance between the virtual space position of the second object and the virtual space position of the user, acquire indoor coordinates of each of the first and second objects from the indoor map, estimate a first indoor prediction position and a second indoor prediction position of the user using the first and second Euclidean distances and the indoor coordinates of the first and second objects, calculate a virtual-space outer product corresponding to an outer product of a first virtual vector and a second virtual vector which are respective vectors from the virtual space position of the user to the virtual space positions of the first and second objects, calculate a first indoor outer product corresponding to an outer product of a first real vector and a second real vector which are vectors from the first indoor prediction position to the indoor coordinates of the first and second objects, and a second indoor outer product corresponding to an outer product of a first real vector and a second real vector which are vectors from the second indoor prediction position to the indoor coordinates of the first and second objects, and estimate an indoor prediction position at which the first or second indoor outer product has the same sign as the virtual-space outer product as the indoor position of the user.

2. The terminal device of claim 1, further comprising a display, wherein the controller displays the position of the user on the indoor map through the display together with the image acquired through the imager.

3. The terminal device of claim 1, wherein the controller recognizes the first and second objects using deep learning and estimates each of the virtual space positions of the first and second objects using point clouds generated in a virtual space.

4. The terminal device of claim 1, wherein the controller estimates the virtual space position of the user using a dead reckoning algorithm.

5. The terminal device of claim 1, further comprising a transmitter configured to communicate with a service server through a communication network, wherein, when an image collection application stored in the storage is executed, the controller images predetermined objects through the imager, stores a captured image of each of the objects, and transmits the stored captured image of each of the objects to the service server through the transmitter.

6. A service server comprising:

a transmitter configured to receive a captured image of each object set on an indoor map; and at least one processor configured to learn the captured image of each object received through the transmitter and generate an object recognition model for object recognition by matching each object to coordinates of the object through the learned captured image of the object and:

recognize, when a position estimation request signal including the captured image is received from a terminal device through the transmitter, first and second objects by inputting the captured image to the object recognition model, estimate virtual space positions of the first and second objects, estimate a virtual space distance between a user and each of the first and second objects using the virtual space positions of the first and second objects and a virtual space position of the user, calculate a first Euclidean distance between the virtual space position of the first object and the virtual space position of the user and calculate a second Euclidean distance between the virtual space position of the second object and the virtual space position of the user, acquire indoor coordinates of each of the first and second objects from the indoor map, estimate a first indoor prediction position and a second indoor prediction position of the user using the first and second Euclidean distances and the indoor coordinates of the first and second objects, calculate a virtual-space outer product corresponding to an outer product of a first virtual vector and a second virtual vector which are respective vectors from the virtual space position of the user to the virtual space positions of the first and second objects, calculate a first indoor outer product corresponding to an outer product of a first real vector and a second real vector which are vectors from the first indoor prediction position to the indoor coordinates of the first and second objects, and a second indoor outer product corresponding to an outer product of a first real vector and a second real vector which are vectors from the second indoor prediction position to the indoor coordinates of the first and second objects, estimate an indoor predicted position at which the first or second indoor outer product has the same sign as the virtual-space outer product as the indoor position of the user, and transmit the estimated indoor position to the terminal device.

7. A method of an indoor positioning service based on object recognition, the method comprising: recognizing, by a terminal device, a first object and a second object in an image acquired through an imager and estimating virtual space positions of the first and second objects; estimating, by the terminal device, a virtual space distance between a user and each of the first and second objects using the virtual space positions of the first and second objects and a virtual space position of the user; and estimating, by the terminal device, an indoor position of the user using the virtual space distances; calculating, by the terminal device, a first Euclidean distance between the virtual space position of the first object and the virtual space position of the user and a second Euclidean distance between the virtual space position of the second object and the virtual space position of the user; wherein the estimating of the indoor position of the user comprises: acquiring, by the terminal device, indoor coordinates of each of the first and second objects from an indoor map and estimating a first indoor prediction position and a second indoor prediction position of the user using the first and second Euclidean distances and the indoor coordinates of the first and second objects; calculating, by the terminal device, a virtual-space outer product corresponding to an outer product of a first virtual vector and a second virtual vector which are respective vectors from the virtual space position of the user to the virtual space positions of the first and second objects; calculating a first indoor outer product corresponding to an outer product of a first real vector and a second real vector which are vectors from the first indoor prediction position to the indoor coordinates of the first and second objects, and a second indoor outer product corresponding to an outer product of a first real vector and a second real vector which are vectors from the second indoor prediction position to the indoor coordinates of the first and second objects; and estimating, by the terminal device, an indoor prediction position at which the first or second indoor outer product has the same sign as the virtual-space outer product as the indoor position of the user.

8. The method of claim 7, wherein the estimating of the virtual space positions of the first and second objects comprises recognizing, by the terminal device, the first and second objects using deep learning and estimating each of the virtual space positions of the first and second objects using point clouds generated in a virtual space.

9. The method of claim 7, wherein the estimating of the virtual space distance comprises: estimating, by the terminal device, the virtual space position of the user using a dead reckoning algorithm.

* * * * *